(No Model.)
G. WEAR.
STOPPER FOR BOTTLES OR SIMILAR VESSELS.
No. 587,350. Patented Aug. 3, 1897.
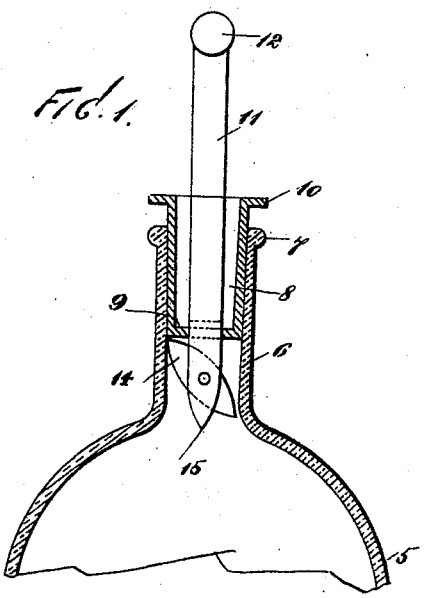
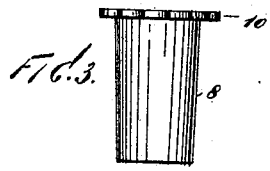
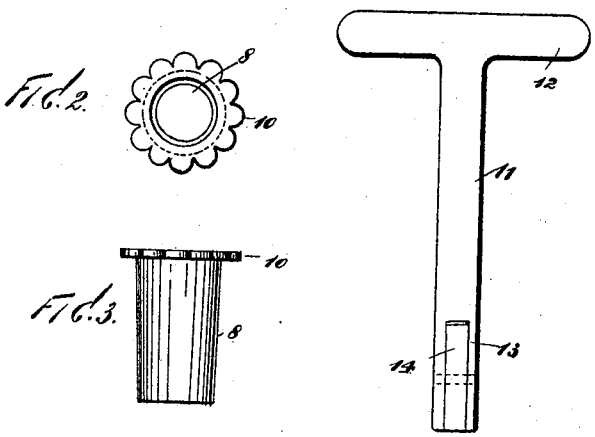
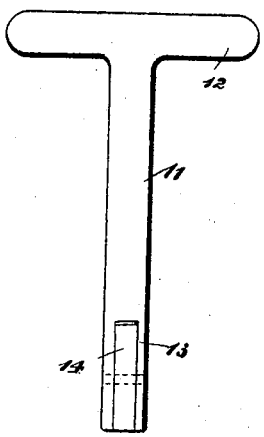
WITNESSES
INVENTOR
Gustav Wear
BY
Edgar Gale & Co
ATTORNEYS

United States Patent Office.

GUSTAV WEAR, OF PHILADELPHIA, PENNSYLVANIA.

STOPPER FOR BOTTLES OR SIMILAR VESSELS.

SPECIFICATION forming part of Letters Patent No. 587,350, dated August 3, 1897.

Application filed November 6, 1896. Serial No. 611,281. (No model.)

*To all whom it may concern:*

Be it known that I, GUSTAV WEAR, a citizen of the United States, residing at Philadelphia, in the county of Philadelphia and State of Pennsylvania, have invented certain new and useful Improvements in Stoppers for Bottles or Similar Vessels, of which the following is a full and complete specification, such as will enable those skilled in the art to which it appertains to make and use the same.

This invention relates to stoppers for bottles, jugs, jars, and similar vessels; and the object thereof is to provide an improved device of this class and improved means for removing the same from the vessel after it has once been inserted into the neck thereof.

The invention is fully disclosed in the following specification, of which the accompanying drawings form a part, in which I have shown my invention applied to a bottle, and in which—

Figure 1 is a central vertical section of the upper part of a bottle and the neck thereof provided with my improved stopper and with the means which I employ for removing the same from the neck of the bottle; Fig. 2, a plan view of the stopper; Fig. 3, a side view thereof, and Fig. 4 a side view of the device which I employ for removing the stopper.

In the drawings forming part of this specification the separate parts of the device are designated by similar numerals of reference wherever found throughout the several views, and in the practice of my invention, as shown in the drawings, I provide a bottle 5, having a neck 6, which is preferably provided at its upper end with the usual annular bead 7, and I also provide a stopper 8, which is hollow and tubular in form, and the lower end of which is closed, as shown at 9, and the upper end thereof is provided with an annular convoluted flange 10.

The lower end of the stopper is preferably slightly smaller than the upper end and said stopper is composed of paper or similar material and the outer surface thereof is covered with a composition by which it is protected from the action of fluids, and I also provide a key for removing the stopper from the neck of the bottle, which consists of a shaft 11, provided at one end with a crosshead or handle 12 and at the opposite end with an open longitudinal slot 13, in which is pivoted a key-plug 14, which is of the form shown in Figs. 1 and 4, the opposite ends thereof being both pointed, and the lower end of the shaft 11 is also similarly pointed, as shown at 15.

In order to seal or close the neck of the bottle, the stopper 8 is forced thereinto, as shown in Fig. 1, and said stopper is preferably forced downwardly until the flange 10 rests on the annular bead 7 of the neck, and whenever it is desired to remove the stopper the key is passed into the stopper and forced through the bottom thereof, the key-plug 14 in this operation being in the position shown in Fig. 4.

One end of the key-plug is preferably slightly heavier or longer than the other, and as soon as it passes through the bottom of the stopper it turns into the position shown in Fig. 1, in which the upper end thereof swings outwardly against the neck of the bottle, and then by pulling outwardly on the cross-head or handle 12 of the key the stopper will be withdrawn, as will be readily understood.

My improved stopper is well adapted to accomplish the result for which it is intended and may be made at a comparatively slight expense, and my invention is not limited to the exact form of the key herein described for removing the same from the neck of the bottle.

Having fully described my invention, I claim as new and desire to secure by Letters Patent—

A stopper for bottles and other vessels, which is tubular in form, and the lower end of which is closed, said stopper being composed of paper or similar material, and means for removing the same from the neck of the bottle or other vessel, consisting of a key, composed of a shaft and handle, the lower end of the shaft being pointed, and provided with a slot in which is pivoted a key-plug which is also pointed at both ends, substantially as shown and described.

In testimony that I claim the foregoing as my invention I have signed my name, in presence of the subscribing witnesses, this 31st day of October, 1896.

G. WEAR.

Witnesses:
M. SCHAAFE,
A. DEBBECKE.